(12) United States Patent
Yamamoto (10) Patent No.: US 8,690,231 B2
(45) Date of Patent: Apr. 8, 2014

(54) VEHICLE STRUCTURE BODY

(75) Inventor: Shuuitsu Yamamoto, Miyoshi (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 28 days.

(21) Appl. No.: 13/258,897

(22) PCT Filed: Jun. 18, 2009

(86) PCT No.: PCT/JP2009/061106
§ 371 (c)(1),
(2), (4) Date: Sep. 22, 2011

(87) PCT Pub. No.: WO2010/146690
PCT Pub. Date: Dec. 23, 2010

(65) Prior Publication Data
US 2012/0242112 A1 Sep. 27, 2012

(51) Int. Cl.
*B62D 25/04* (2006.01)
*B62D 25/06* (2006.01)

(52) U.S. Cl.
USPC ............ 296/193.05; 296/193.06; 296/193.12; 296/187.12; 296/187.13; 296/203.03

(58) Field of Classification Search
USPC ............ 296/187.13, 193.12, 203.01, 203.03, 296/205, 210, 193.05, 193.06, 187.12, 29; 29/897.2
See application file for complete search history.

(56) References Cited

U.S. PATENT DOCUMENTS

| | | | |
|---|---|---|---|
| 5,458,393 A * | 10/1995 | Benedyk | 296/203.01 |
| 5,549,352 A * | 8/1996 | Janotik et al. | 296/209 |
| 6,282,790 B1 * | 9/2001 | Jaekel et al. | 29/897.2 |
| 6,578,909 B1 * | 6/2003 | Reed et al. | 296/210 |
| 7,357,448 B2 * | 4/2008 | Chen et al. | 296/203.03 |
| 7,407,222 B2 * | 8/2008 | Anderson et al. | 296/193.06 |
| 8,123,286 B2 * | 2/2012 | Furusako et al. | 296/203.03 |

(Continued)

FOREIGN PATENT DOCUMENTS

DE 102005011834 A1 9/2006
JP 49-100315 U 12/1972

(Continued)

OTHER PUBLICATIONS

International Preliminary Report on Patentability dated Dec. 22, 2011.

*Primary Examiner* — Glenn Dayoan
*Assistant Examiner* — Gregory Blankenship
(74) *Attorney, Agent, or Firm* — Sughrue Mion, PLLC (57) ABSTRACT

A vehicle structure body includes roof side rails 10 that extend in the longitudinal direction of a vehicle on both sides in a vehicle width direction, and center pillars 20 that are connected to rear end portions 10a of the roof side rails 10 and extend in a vertical direction of the vehicle. The cross-sectional area of the roof side rail 10 is substantially constant from the front end of the roof side rail 10 to a front position P in front of the center pillar 20, and the cross-sectional area of the roof side rail is reduced from the front position P to a position S immediately before a joint portion between the roof side rail 10 and the center pillar 20. When a collision load acts on the roof side rail 10, the roof side rail 10 is easily folded at a portion of which the cross-sectional area is reduced. Accordingly, it is possible to reduce the input of moment to the center pillar 20.

3 Claims, 6 Drawing Sheets

(56) References Cited

U.S. PATENT DOCUMENTS

2003/0141747 A1    7/2003  Honma et al.
2004/0239091 A1*  12/2004  Horton et al. ................ 280/781
2006/0273630 A1*  12/2006  Chen et al. ............... 296/203.03
2007/0200314 A1*   8/2007  Anderson et al. ............. 280/210
2012/0242112 A1*   9/2012  Yamamoto ............... 296/193.06

FOREIGN PATENT DOCUMENTS

| JP | 11-291947 A   | 10/1999 |
| JP | 2003-212148 A | 7/2003  |
| JP | 2008-37123 A  | 2/2008  |

* cited by examiner

VEHICLE STRUCTURE BODY

CROSS REFERENCE TO RELATED APPLICATIONS

This application is a National Stage of International Application No. PCT/JP2009/061106 filed on Jun. 18, 2009, the contents of all of which are incorporated herein by reference in their entirety.

TECHNICAL FIELD

The present invention relates to a vehicle structure body that includes roof side rails and center pillars.

BACKGROUND ART

For some time, as a vehicle structure body including roof side rails and center pillars, there has been known a vehicle structure body that joins end portions of a rear header, which is disposed at the rear end of a roof, in a vehicle width direction to upper end portions of center pillars erected in the middle of the side portions of a vehicle and includes a frame joining joint portions thereof to an under body as described in, for example, Japanese Unexamined Patent Application Publication No. 2008-37123. According to this vehicle structure body, it is possible to improve the torsional rigidity of an upper portion of a vehicle body, and to secure sufficient rigidity of an upper portion of a vehicle body.

CITATION LIST

Patent Literature

[Patent Literature 1] Japanese Unexamined Patent Application Publication No. 2008-37123

SUMMARY OF INVENTION

Technical Problem

Figure 6:
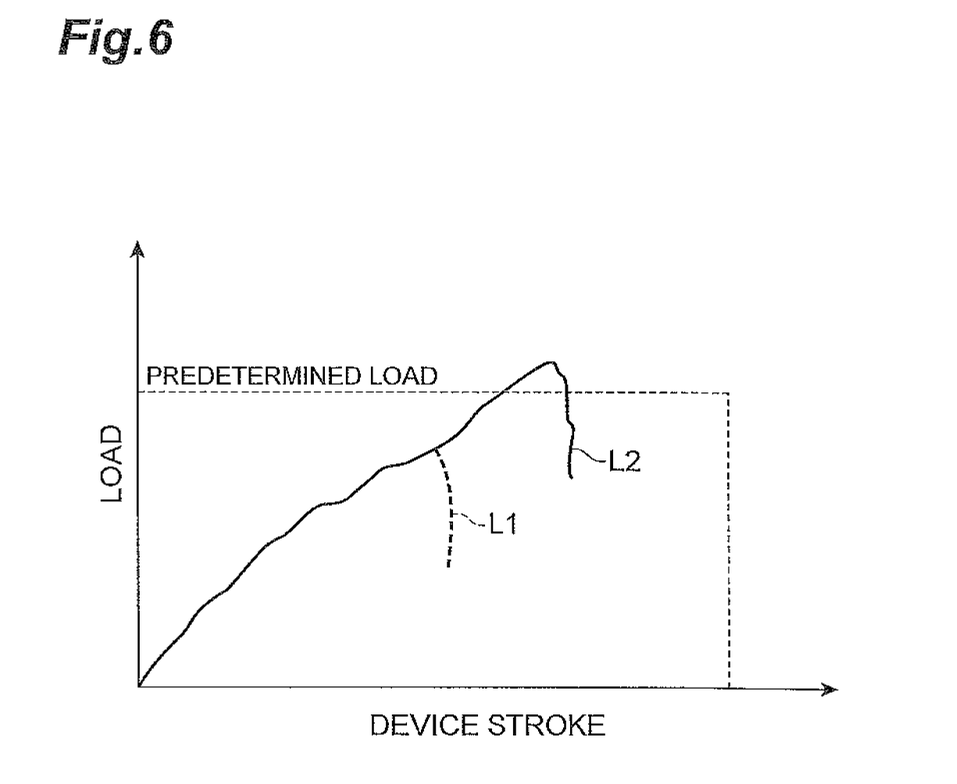
FIG. 6 is a view showing a relationship between a load and a device stroke in the related art.

However, in the structure body in the related art, roof side rails, which support a roof, are joined to center pillars while the cross-sectional area of the roof side rail is maintained constant. For this reason, there has been a problem in that the shape of the structure body in the related art cannot be changed to a desired shape when a collision load applied by a collision device or the like acts on the roof. Accordingly, since a point of application of a collision load is distant from the center pillar when the collision load is input to the center pillar from the roof side rail, the input of moment to the center pillar is large. Therefore, the deformation of the center pillar easily occurs (see L1 in FIG. 6). As a result, it is necessary to reinforce the center pillar in order to achieve a predetermined load (see L2 in FIG. 6).

The invention has been made to solve this technical problem, and an object of the invention is to provide a vehicle structure body that can suppress the deformation of a center pillar by being changed into a desired shape when a load acts.

Solution to Problem

According to an aspect of the invention, there is provided a vehicle structure body. The vehicle structure body includes roof side rails that extend in a longitudinal direction of a vehicle on both sides in a vehicle width direction, and center pillars that are connected to rear end portions of the roof side rails and extend in a vertical direction of the vehicle. The cross-sectional area of the roof side rail is reduced from the front of the center pillar toward the rear end of the roof side rail.

According to the aspect of the invention, the cross-sectional area of the roof side rail is reduced from the front of the center pillar toward the rear end of the roof side rail. Accordingly, for example, when a collision load acts on the roof side rail, the portion of which the cross-sectional area is reduced can be easily deformed so as to be bent. Since the roof side rail is deformed so as to be bent at the portion of which the cross-sectional area is reduced, it is possible to reduce the input of moment to the center pillar and to suppress the deformation of the center pillar. As a result, the vehicle structure body can be changed into a desired shape when a load acts, and can suppress the deformation of the center pillar. Further, since a collision load is directly supported by the center pillar in this case, it is possible to minimize the reinforcement of the center pillar that is to generate a predetermined load.

In the vehicle structure body according to the aspect of the invention, the cross-sectional area of the roof side rail may be continuously reduced over a predetermined length from the front of the center pillar toward the rear end of the roof side rail. Accordingly, it is possible to suppress the reduction of structural strength that is caused by the rapid reduction of a cross-sectional area.

Advantageous Effects of Invention

According to the invention, it is possible to provide a vehicle structure body that can suppress the deformation of a center pillar by being changed into a desired shape when a load acts.

DESCRIPTION OF EMBODIMENTS

Figure 1:
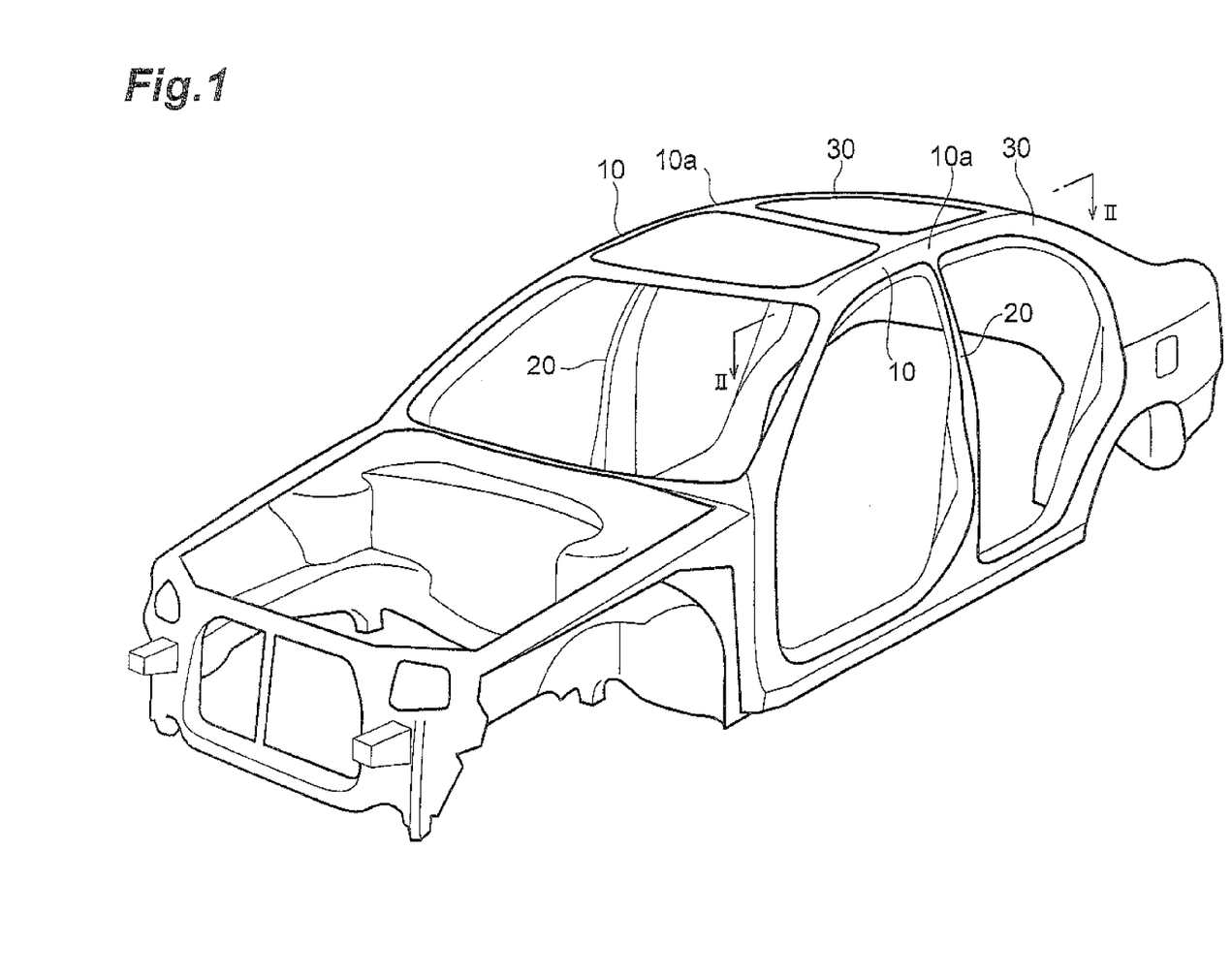
FIG. 1 is a perspective view of a vehicle to which a vehicle structure body according to an embodiment is applied.
Figure 2:
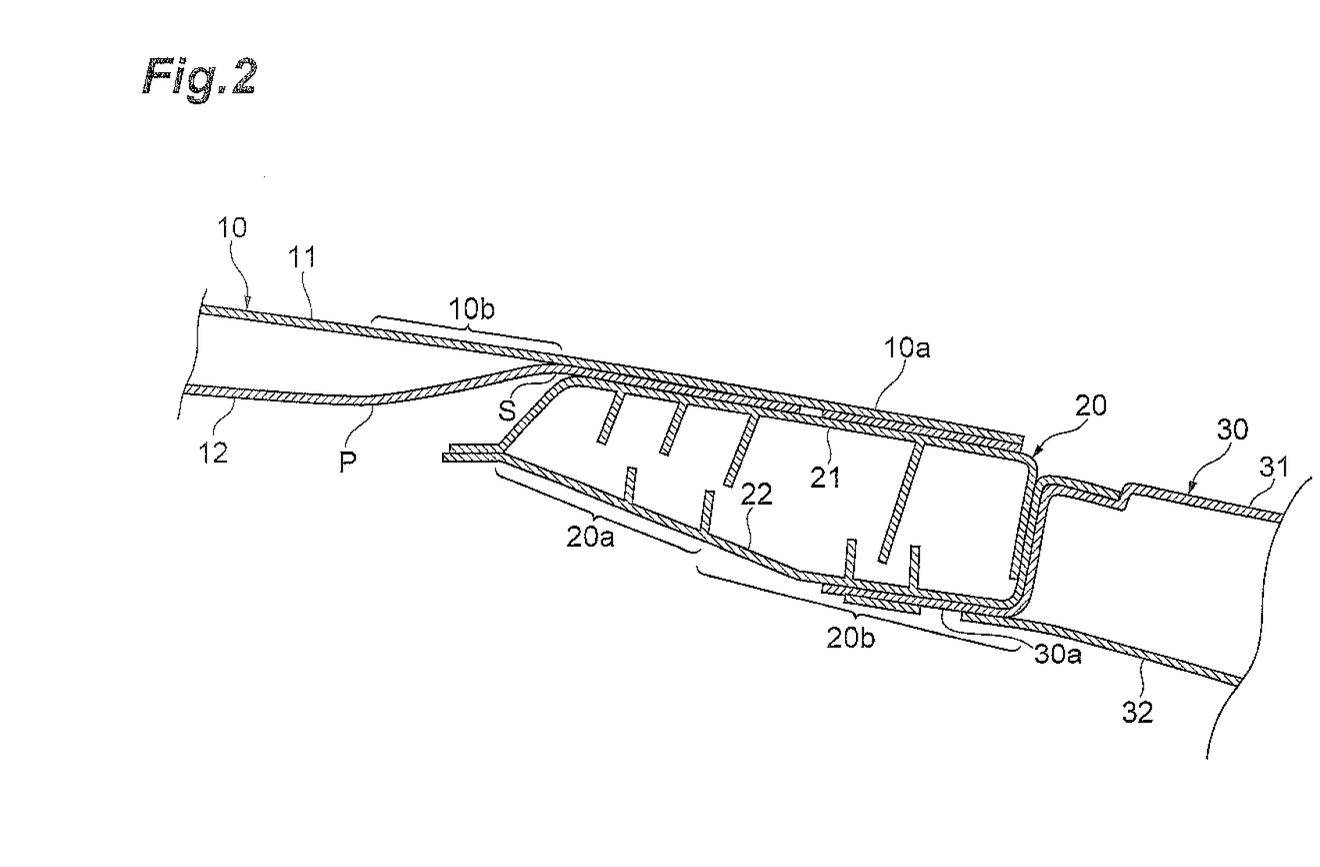
FIG. 2 is a cross-sectional view taken along a line II-II of FIG. 1.

An embodiment of the invention will be described in detail below with reference to the accompanying drawings. FIG. 1 is a perspective view of a vehicle that includes a vehicle structure body according to an embodiment, and FIG. 2 is a cross-sectional view taken along a line II-II of FIG. 1. The vehicle structure body according to this embodiment is a lightweight structure that generates a predetermined load in a head living space by crushing the cross-section of a rear end portion 10a of a roof side rail 10 of an upper body made of carbon fiber reinforced plastics (CFRP) and joining the rear end portion to a center pillar reinforcing portion 20a.

As shown in FIG. 1, the vehicle structure body includes roof side rails 10 that are disposed at the roof portion of a vehicle and extend in the longitudinal direction of the vehicle on both sides in a vehicle width direction; center pillars 20 that are connected to rear end portions 10a of the roof side rails 10 and extend in a vertical direction of the vehicle; and a quarter 30 that is disposed on the rear side of the roof side rails 10 and extends in the vehicle width direction. The roof side rails 10, the center pillars 20, and the quarter 30 are joined to each other by welding or the like.

As shown in FIG. 2, the roof side rail 10 includes a roof side rail outer 11 disposed on the outside of the vehicle and a roof side rail inner 12 disposed on the inside of the vehicle, and has a closed cross-sectional structure. The roof side rail outer 11 and the roof side rail inner 12 face each other and are fixed to each other by welding or the like, so that the roof side rail 10 is formed.

The cross-sectional area of the roof side rail 10 is substantially constant from the front end of the roof side rail to a front position P in front of the center pillar 20, and is reduced from the front position P toward the rear end of the roof side rail 10. Specifically, the cross-section of the roof side rail 10 has substantially constant shape and size from the front end of the roof side rail 10 to the front position P in front of the center pillar 20, and is gradually reduced so as to be crushed from the front position P to a position S immediately before a joint portion between the roof side rail 10 and the center pillar 20. Further, the portion of which the cross-section is crushed forms a cross-section crushing portion 10b. As shown in FIG. 2, the cross-sectional area of the cross-section crushing portion 10b starts to be reduced from the front position P, and is gradually reduced over the length from the front position P to the position S. Then, the cross-section of the cross-section crushing portion is substantially completely crushed at the position S. Meanwhile, the invention is not limited to a case where the cross-sectional area of the roof side rail is substantially constant from the front end of the roof side rail 10 to the front position P, and the height of a portion of the roof side rail between the front end and the front position P may be changed in the longitudinal direction of the vehicle. Moreover, when a portion of the roof side rail between the front end and the front position P and a portion of the roof side rail between the front position P and the position S are compared to each other in terms of the change in height in the longitudinal direction, the portion of the roof side rail between the front position P and the position S is formed so as to have a larger height change per unit length.

Meanwhile, the reduction of the cross-sectional area includes a case where the cross-section is completely crushed so that gaps are not formed between the roof side rail outer 11 and the roof side rail inner 12 and a case where hollows portions remain to an extent.

The center pillar 20 is disposed between the roof side rail 10 and the quarter 30, and is joined to the rear end portion 10a of the roof side rail 10 and a front end portion 30a of the quarter 30. The center pillar 20 includes a center pillar outer 21 disposed on the outside of the vehicle and a center pillar inner 22 disposed on the inside of the vehicle, and has a closed cross-sectional structure. The center pillar outer 21 and the center pillar inner 22 face each other and are fixed to each other by welding or the like, so that the center pillar 20 is formed. Further, the center pillar 20 includes a center pillar reinforcing portion 20a that is disposed close to the roof side rail 10 and a general center pillar portion 20b that is disposed close to the quarter 30.

The quarter 30 includes a quarter outer 31 disposed on the outside of the vehicle and a quarter inner 32 disposed on the inside of the vehicle, and has a closed cross-sectional structure. The quarter outer 31 and the quarter inner 32 face each other and are fixed to each other by welding or the like, so that the quarter 30 is formed.

Figure 3:
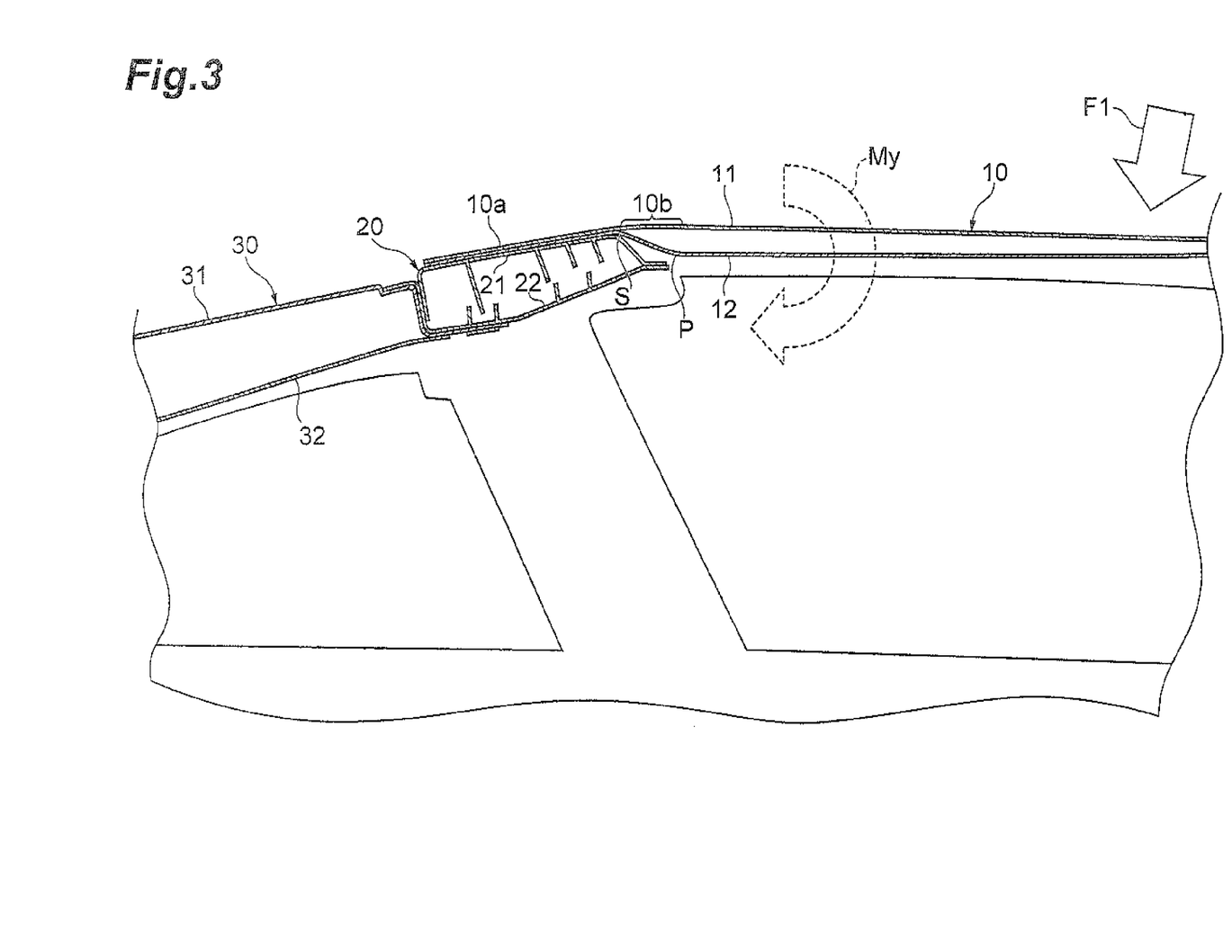
FIG. 3 is a view illustrating the deformation of a roof side rail when a collision load acts.
Figure 4:
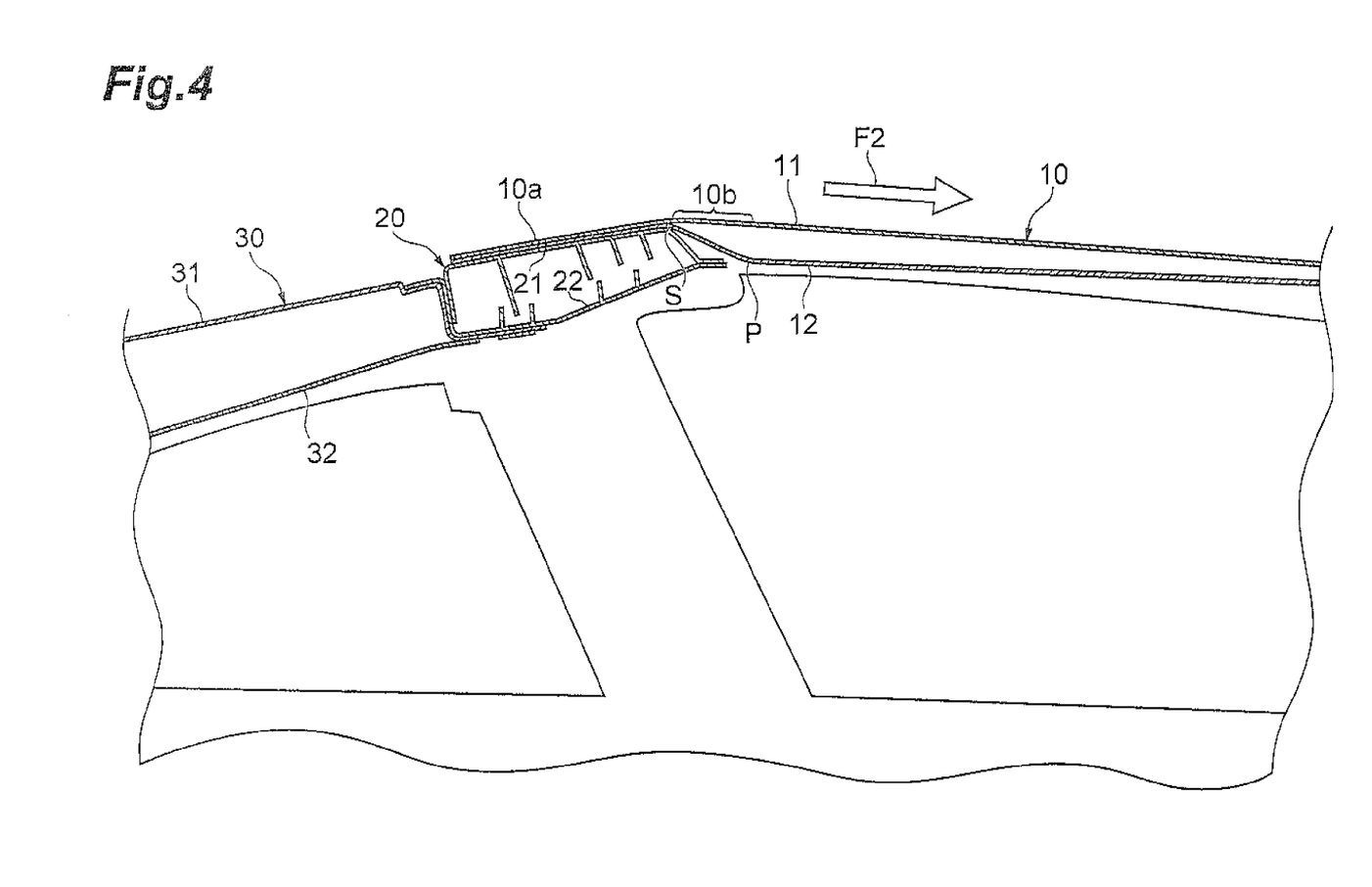
FIG. 4 is a view illustrating the deformation of a roof side rail when a collision load acts.

FIGS. 3 and 4 are views illustrating the deformation of the roof side rail when a collision load acts. In a FIG. 3, an arrow F1 shows the traveling direction of a collision device. The collision device travels along the arrow F1, and the cross-sectional area of a portion of the roof side rail, which is formed between the front position P in front of the center pillar 20 and the position S immediately before the joint portion between the roof side rail 10 and the center pillar 20, is reduced in an early stage where a collision load acts on the roof side rail 10. Accordingly, the roof side rail 10 is easily folded at the portion of which the cross-sectional area is reduced (that is, the cross-section crushing portion 10b). For this reason, it is possible to reduce the input of moment My to the center pillar 20 and to suppress the deformation of the center pillar 20. As a result, the vehicle structure body can be changed into a desired shape when a load acts, and can suppress the deformation of the center pillar 20.

As shown in FIG. 4, a force in the traveling direction of the collision device is directly supported by the center pillar 20 in a latter half of collision where a collision device is close to the center pillar reinforcing portion 20a. Accordingly, the component of a force of the collision device toward the rear side of the vehicle is supported by forward tension of the roof side rail 10 (see arrow F2).

Figure 5:
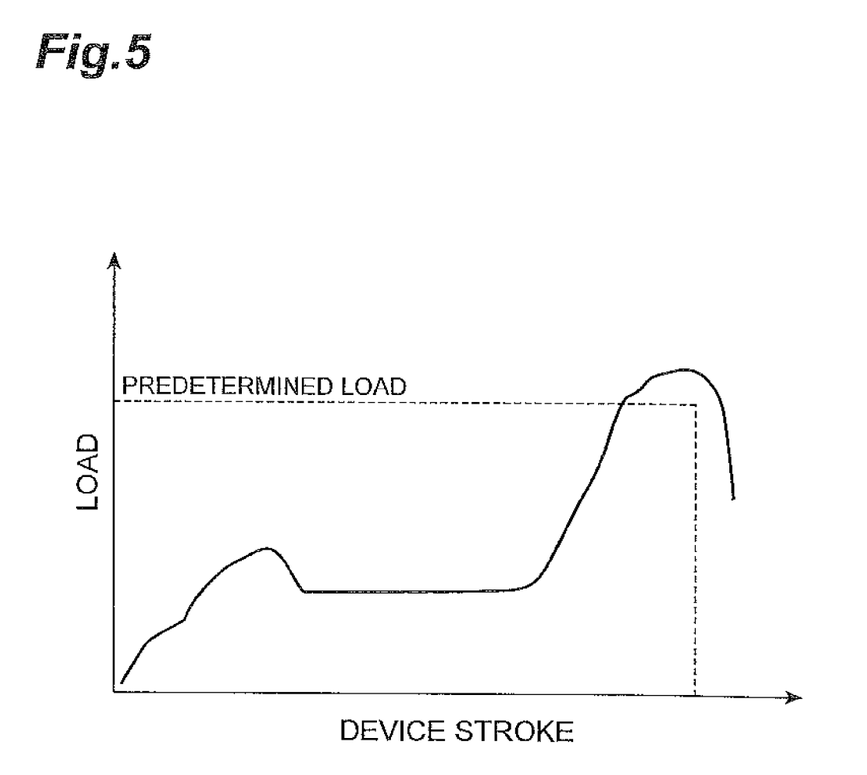
FIG. 5 is a view showing a relationship between a load and a device stroke.

FIG. 5 is a view showing a relationship between a load and a device stroke. In FIG. 5, the horizontal axis represents a device stroke and the vertical axis represents a collision load. As shown in FIG. 5, a force in the traveling direction of the collision device is directly supported by the center pillar 20 in the latter half of collision. Accordingly, it is possible to minimize the reinforcement of the center pillar 20 that is to generate a predetermined load. Further, it is possible to easily maintain the reduction of the weight of the vehicle by minimizing the reinforcement of the center pillar 20 as described above.

Meanwhile, the above-mentioned embodiment shows an example of the vehicle structure body according to the invention. The vehicle structure body according to the invention is not limited to the vehicle structure body described in the above-mentioned embodiment. The vehicle structure body according to the invention may be obtained by modifying the vehicle structure body according to the embodiment without changing the scope described in each claim or by applying the vehicle structure body according to the embodiment to other vehicle structure bodies.

DESCRIPTION OF REFERENCE SIGNS

10: roof side rail
10a: rear end portion
10b: cross-section crushing portion
20: center pillar
30: quarter
P: front position in front of center pillar
S: position immediately before joint portion between roof side rail and center pillar

The invention claimed is:

1. A vehicle structure body comprising:
roof side rails that extend in a longitudinal direction of a vehicle on both sides in a vehicle width direction;
quarters that extend in a longitudinal direction of the vehicle on the both sides in the vehicle width directions; and
center pillars that are connected to rear end portions of the roof side rails and front end portions of the quarters, the center pillars extending in a vertical direction of the vehicle, wherein the cross-sectional area of a first part of each of the roof side rails is reduced from a position in the roof side rail at a front of the center pillar to the rear end portion of the roof side rail; and wherein each of the roof side rails comprises a roof side outer rail and a roof side inner rail that contact each another at the rear end portion of the side rail.

2. The vehicle structure body according to claim 1, wherein the cross-sectional area of a second part of each of the roof side rails is substantially constant from the position in the roof side rail at the front of the center pillar to a front end of the roof side rail.

3. The vehicle structure body according to claim 1, wherein a cross-sectional area of a second part of each of the roof side rails is reduced from the position in the roof side rail at the front of the center pillar to a front end of the roof side rail, the cross-sectional area of the second part of the roof side rail being reduced at a smaller rate than the cross-sectional area of the first part of the first roof side rail.

* * * * *